(12) United States Patent
Verslegers et al.

(10) Patent No.: US 9,798,084 B2
(45) Date of Patent: Oct. 24, 2017

(54) PHOTONIC CHIP GRATING COUPLERS

(71) Applicant: Google Inc., Mountain View, CA (US)

(72) Inventors: Lieven Verslegers, Mountain View, CA (US); Ryohei Urata, San Carlos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/354,643

(22) Filed: Nov. 17, 2016

(65) Prior Publication Data

US 2017/0146736 A1    May 25, 2017

Related U.S. Application Data

(60) Provisional application No. 62/258,221, filed on Nov. 20, 2015.

(51) Int. Cl.
 *G02B 6/124*     (2006.01)
 *G02B 6/126*     (2006.01)
 (Continued)

(52) U.S. Cl.
CPC ............ *G02B 6/124* (2013.01); *G02B 6/126* (2013.01); *G02B 6/2706* (2013.01);
(Continued)

(58) Field of Classification Search
None
See application file for complete search history.

(56) References Cited

U.S. PATENT DOCUMENTS

| | | | |
|---|---|---|---|
| 5,621,715 A | * | 4/1997 | Ohyama ............... G02B 6/124 369/103 |
| 7,729,579 B1 | | 6/2010 | Greiner et al. |

(Continued)

FOREIGN PATENT DOCUMENTS

| | | |
|---|---|---|
| WO | 2015032095 A1 | 3/2015 |
| WO | 2015176050 A1 | 11/2015 |

OTHER PUBLICATIONS

Taillaert, Dirk, et al. Compact efficient broadband grating coupler for silicon-on-insulator waveguides, Optics Letters, vol. 29, No. 23, pp. 2749-2751, Dec. 2004.

(Continued)

*Primary Examiner* — Mike Stahl
(74) *Attorney, Agent, or Firm* — McDermott Will & Emery LLP

(57) ABSTRACT

This disclosure provides systems, methods, and apparatus for a photonic chip. The photonic chip includes one or more electronic components in addition to one or more optical components. An optical coupler can be utilized for coupling external optical fibers or sources with the optical components. The optical coupler can include a beam splitter for splitting an incident light having both trans-electric (TE) and trans-magnetic (TM) polarizations into two beams having only TE and TM polarizations. The light beam with TM polarization is incident on a grating coupler on the chip having a horn section, which includes gratings. The light beam is reflected onto the grating coupler such that the direction of TM polarization is within the first plane of incidence, and the first beam of light is incident on the first plurality of gratings at an angle with respect to a normal to the plane of the first grating coupler.

8 Claims, 6 Drawing Sheets

(51) Int. Cl.
*G02B 6/27* (2006.01)
*G02B 6/30* (2006.01)
*G02B 6/34* (2006.01)
*G02B 6/12* (2006.01)

(52) U.S. Cl.
CPC ............ *G02B 6/2773* (2013.01); *G02B 6/30* (2013.01); *G02B 6/34* (2013.01); *G02B 6/12* (2013.01); *G02B 2006/12061* (2013.01); *G02B 2006/12104* (2013.01)

(56) References Cited

U.S. PATENT DOCUMENTS

| | | | | |
|---|---|---|---|---|
| 8,503,841 B2* | 8/2013 | Kopp | ................ | G02B 6/126 385/11 |
| 8,660,391 B1* | 2/2014 | Fish | ................ | B82Y 20/00 359/484.03 |
| 2004/0184156 A1* | 9/2004 | Gunn, III | ............ | G02B 6/1228 359/629 |
| 2009/0285529 A1 | 11/2009 | Iazikov et al. | | |
| 2010/0006784 A1* | 1/2010 | Mack | ................ | G02B 6/34 250/551 |
| 2010/0119229 A1 | 5/2010 | Roelkens et al. | | |
| 2014/0314374 A1* | 10/2014 | Fattal | ................ | G02B 6/124 385/33 |
| 2014/0363127 A1* | 12/2014 | Baets | ................ | G02B 6/124 385/37 |
| 2015/0117808 A1* | 4/2015 | Chen | ................ | G02B 6/30 385/2 |
| 2015/0215046 A1 | 7/2015 | Mekis et al. | | |
| 2016/0091664 A1* | 3/2016 | Doany | ................ | G02B 6/34 385/37 |
| 2016/0238793 A1* | 8/2016 | Frankel | ................ | G02B 6/305 |
| 2016/0246009 A1* | 8/2016 | Jiang | ................ | G02B 6/124 |
| 2016/0377811 A1* | 12/2016 | Goodwill | ............ | G02B 6/2706 385/24 |

OTHER PUBLICATIONS

Taillaert, Dirk, et al. A compact two-dimensional grating coupler used as a polarization splitter, IEEE Photonics Technology Letters, vol. 15, No. 9, pp. 1249-1251, Sep. 2003.

Bakir, B. Ben, et al. Low-loss (< 1 dB) and polarization-insensitive edge fiber couplers fabricated on 200-mm silicon-on-insulator wafers, IEEE Photon. Technol. Letters, vol. 22, No. 11, pp. 739-741, Jun. 2010.

Extended European Search Report dated Mar. 31, 2017 in European Patent Application No. 16199714.3.

* cited by examiner

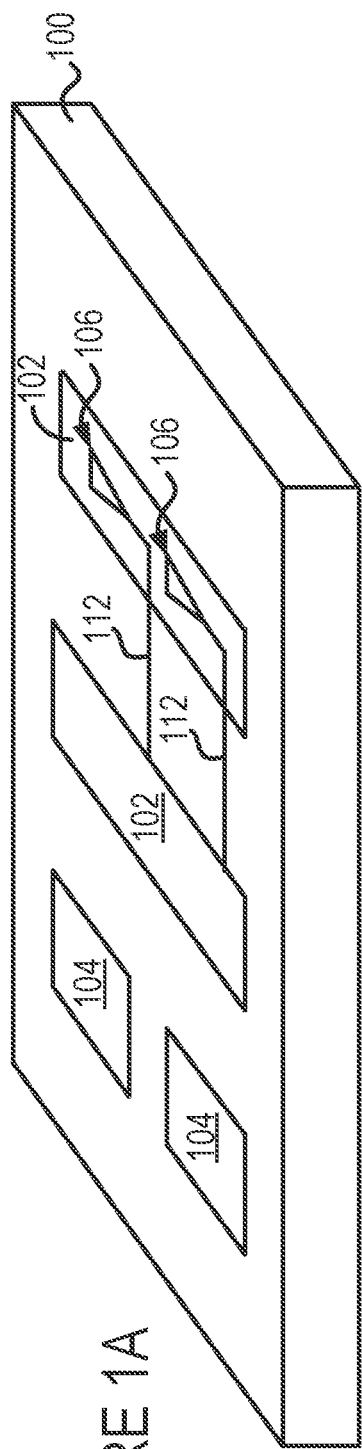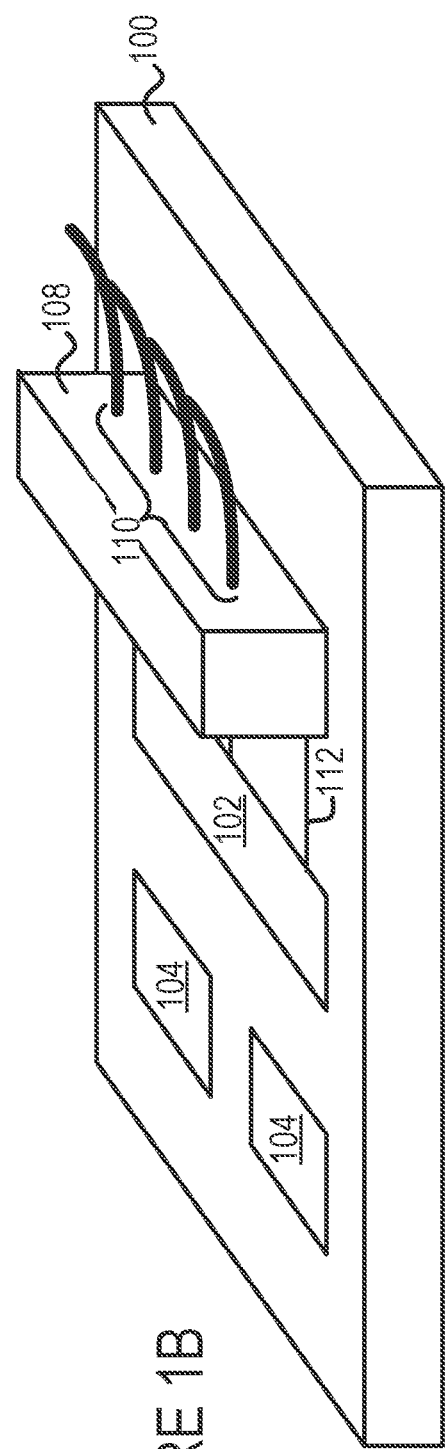

PHOTONIC CHIP GRATING COUPLERS

CROSS-REFERENCE TO RELATED APPLICATIONS

The present application claims priority to U.S. Provisional Patent Application No. 62/258,221, entitled "PHOTONIC CHIP GRATING COUPLERS," filed Nov. 20, 2015, the entirety of which is hereby incorporated by reference.

TECHNICAL FIELD

This disclosure relates to the field of optical communication, and in particular to optical couplers.

DESCRIPTION OF THE RELATED TECHNOLOGY

Silicon photonics, which include manufactured optical, electrical and optoelectronic components on the same chip, can provide low-cost, low-power, high-speed optical solutions for datacomm, telecommunications, and in particular optical communications. By integrating optical, electrical and optoelectronic components on the same substrate, scaling of transceiver channels and transmission speeds can be achieved.

SUMMARY

At least one aspect is directed to a coupling apparatus for coupling light from a source to a chip. The coupling apparatus includes a beam splitter having an input port, a first output port and a second output port, the beam splitter configured to receive an incident beam of light at the input port and output a first beam of light with substantially transverse-magnetic (TM) polarization from the first output port and output a second beam of light with substantially transverse-electric (TE) polarization from the second output port. The coupling apparatus includes a first grating coupler formed on the chip, including a first horn section, the first horn section including a first grating with a first plurality of arc-shaped grating lines. The coupling apparatus includes a first reflector positioned to reflect the first beam of light onto the first grating coupler such that a first plane of incidence of the first beam of light is substantially normal to the axis of the first horn section, the direction of TM polarization is within the first plane of incidence, and the first beam of light is incident on the first grating at an angle with respect to a normal to the plane of the first grating coupler.

In some implementations, the coupling apparatus includes a second grating coupler formed on the chip, including a second horn section, the second horn section including a second grating with a second plurality of arc-shaped grating lines; and a second reflector positioned to reflect the second beam of light onto the second grating coupler such that a second plane of incidence of the second beam of light is substantially parallel to the axis of the second horn section, the direction of TE polarization is substantially normal to the second plane of incidence, and the second beam of light is incident on the second grating at an angle with respect to a normal to the plane of the second grating coupler.

In some implementations, the first horn section and the second horn section include silicon.

In some implementations, the axis of the first horn section is the axis of symmetry of the first horn section within the plane of the first horn section.

In some implementations, the first plurality of arc shaped grating lines are substantially asymmetric about an axis of the first horn section.

In some implementations, the second plurality of arc shaped grating lines are shaped substantially as elliptical arcs.

In some implementations, the first horn section includes a narrow end coupled to a waveguide and the first grating directs incident light toward the narrow end of the horn section and into the waveguide.

In some implementations, the second horn section includes a narrow end coupled to a waveguide and the second grating directs incident light toward the narrow end of the horn section and into the waveguide.

BRIEF DESCRIPTION OF THE DRAWINGS

FIG. 1A shows a schematic of an example photonic chip for use in optical communications.

FIG. 1B shows a schematic of the example photonic chip shown in FIG. 1A coupled to an optical coupler.

Like reference numbers and designations in the various drawings indicate like elements.

DETAILED DESCRIPTION

Figure 2:
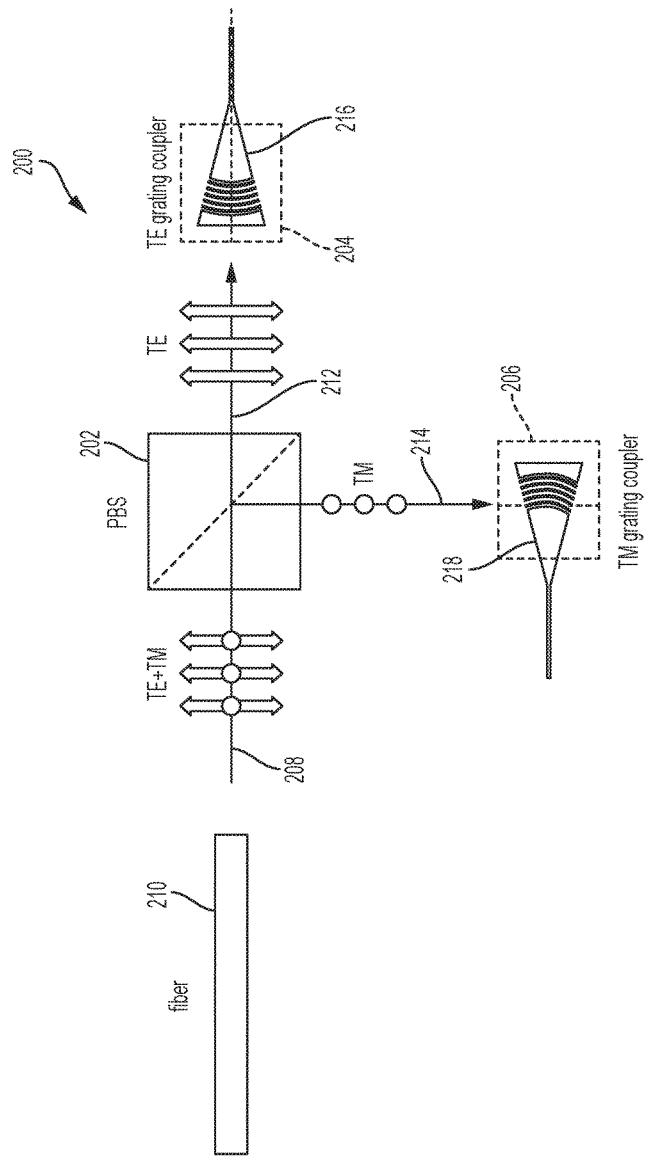
FIG. 2 shows a schematic of the optical components within an optical coupler.

The various concepts introduced above and discussed in greater detail below may be implemented in any of numerous ways, as the described concepts are not limited to any particular manner of implementation. Examples of specific implementations and applications are provided primarily for illustrative purposes.

One of the key challenges in silicon photonics technology is to efficiently couple light from a laser or an optical fiber into and out of a photonic chip. Silicon photonic integrated circuits are typically designed to operate on and process a single (fundamental) waveguide mode, where the fundamental waveguide mode refers to the direction of polarization of the light being processed. Light entering a photonic chip from, for example, an optical fiber or a laser can have transverse-electric (TE) and/or transverse-magnetic (TM) polarizations. Some solutions exist to couple TE polarized light with good efficiency between a fiber or laser and the fundamental mode of a single waveguide, which guides the light on a photonic chip. However, high efficiency solutions are lacking with respect to coupling TM polarized light and the fundamental mode of the waveguide.

Standard TM couplers typically have high optical losses and do not output light with a fundamental mode in the waveguide. As a result, additional polarization rotators are needed to rotate the polarization of the light output by the TM couplers into the fundamental mode. The addition of optical components such as polarization rotators can introduce excess losses and may reduce the link power budget for the communication system.

FIG. 1A shows a schematic of an example photonic chip 100 for use in optical communications. In particular, the photonic chip 100 can be utilized for processing both optical and electronic signals. The photonic chip 100 can include one or more optical/optoelectronic components 102 and one or more electronic components 104. In some implementations, the optical/optoelectronic components 102 can include, without limitation, photo-detectors, lasers, waveguides, splitters, filters, multiplexers, demultiplexers, lenses, reflectors, polarizers, retarders, optical and/or electro-optical modulators, amplifiers, attenuators, etc. In some implementations, modulators other than optical or electro-optic modulators, such as, without limitation, acousto-optic modulators, magneto-optic modulators, mechano-optic modulators, thermo-optic modulators, or combinations thereof, can be utilized. In some implementations, the modulators can utilize techniques such as quadrature amplitude modulation (QAM) and phase shift keying (PSK) for modulating the carrier signals. Other types of modulation may be used. The optical components can be utilized for processing optical signals received over optical fibers or for processing optical signals generated on the photonic chip 100. In some implementations, the photonic chip 100 also can include grating couplers 106, which allow the coupling of optical signals between the optical components 102 on the photonic chip 100 and off-chip optical fibers or lasers. For example, light between the grating couplers 106 and other optical components 106 can be communicated using waveguides 112. The grating couplers 106 are discussed further below in relation to FIGS. 2-5. In some implementations, the electronic components 104 can include analog and digital electronic components such as, without limitations, voltage and/or current amplifiers, transconductance amplifiers, filters, digital signal processors, analog-to-digital converters, digital-to-analog converters, etc. The electronic components 104 and the optical components 102 can be utilized to implement various electro-optical functional blocks such as, without limitation, transmitters, receivers, switches, modulators, repeaters, amplifiers, etc. While FIG. 1A shows optical, electro-optical, and electronic components fabricated on the same chip, in some implementations, these components can be fabricated on separate chips that are interconnected via electrical interconnects (e.g., wire bonds, copper pillars, etc.) and/or optical interconnects (e.g., waveguides, optical fibers, etc.).

FIG. 1B shows a schematic of the example photonic chip 100 shown in FIG. 1A coupled to an optical coupler 108. In particular, the optical coupler 108 can be utilized as an interface between the photonic chip 100 and one or more optical fibers 110. The optical coupler 108 can be generally positioned over the grating couplers 106 (FIG. 1A) on the photonic chip 100. The optical coupler 108 in conjunction with the grating couplers 106 can facilitate bi-directional optical signal communication between the optical fibers 110 and the optical components 102 on the photonic chip 100. In some implementations, the optical coupler 108 can facilitate coupling light sources such as lasers instead of, or in addition to, optical fibers 110 with the photonic chip 100. The optical coupler 108 can include a housing for enclosing one or more optical components. The housing can also provide specific placement and orientations of the optical components such that the light can be received from and sent to the optical fibers 110 and the grating couplers 106 at desired angles.

FIG. 2 shows a schematic of the optical components within an optical coupler 200. In particular, the optical components shown in FIG. 2 can be utilized in the optical coupler 108 shown in FIG. 1B. The optical coupler 200 can include a polarizing beam splitter (PBS) 202, a first prism/reflector 204 and a second prism/reflector 206. The PBS 202 can split an incident light beam into two light beams of different polarizations. In particular, the PBS 202 can split an incident light beam having both TM and TE polarizations into one light beam having substantially only TM polarization and another light beam having substantially only TE polarization. As shown in FIG. 2, a light beam 208 from an optical fiber 210 (such as one of the optical fibers 110 shown in FIG. 1B) is incident onto the PBS 202. The incident light beam 208 has both TM and TE polarizations, such that the TM polarization is orthogonal to the TE polarization, and the TE polarization is within the plane of incidence. The PBS 202 splits the incident light beam 208 into two light beams: a first light beam 212 having TE polarization and a second light beam 214 having TM polarization. The first light beam 212 is directed towards the first prism/reflector 204 while the second light beam 214 is directed to the second prism/reflector 206. The first prism/reflectors 204, in turn, reflects the incident first light beam 212 onto a TE grating coupler 216 on the chip. Similarly, the second prism/reflector 206 reflects the incident second light beam 214 onto a TM grating coupler 218 on the chip. In some implementations, the TE grating coupler 216 and the TM grating coupler 218 can be similar to the grating couplers 106 shown in FIG. 1A.

It is understood that while the optical coupler 200 shows directing a light beam that emerges from the optical fiber 210 onto grating couplers 216 and 218 on a chip, the optical coupler 200 can also combine beams light emerging from the grating couplers 216 and 218 and direct the combined beam of light back into the optical fiber 210.

Figure 3A:
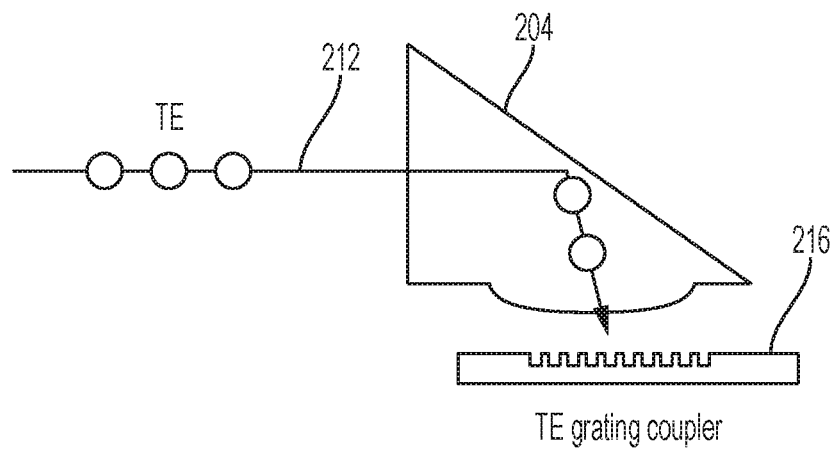
FIGS. 3A and 3B show cross-sectional views of a first prism/reflector, a TE grating coupler, a second prism/reflector, and a TM grating coupler shown in FIG. 2.
Figure 3B:
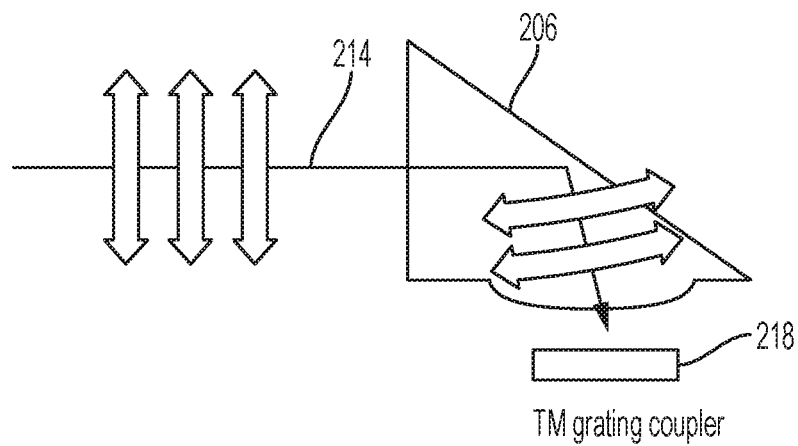

FIGS. 3A and 3B shows cross-sectional views of the first prism/reflector 204, the TE grating coupler 216, the second prism/reflector 206 and the TM grating coupler 218 shown in FIG. 2. In particular, FIG. 3A shows the cross-sectional view of the first prism/reflector 204 and the TE grating coupler 216 along the plane of incidence of the first light beam 212, while FIG. 3B shows the cross-sectional view of the second prism/reflector 206 and the TM grating coupler 218 along the plane of incidence of the second light beam 214. In some implementations, the TE grating coupler 216 and the TM grating coupler 218 can be made of silicon, silicon nitride, silicon oxynitride, polysilicon, or a combination of these materials. Both the first and the second prisms/reflectors 204 and 206 constitute a prism or a reflecting surface such as a mirror to reflect the incident light onto a grating at a particular angle. The first prism/reflector 204 is positioned in relation to the TE grating coupler 216 such that the first light beam 212 is incident onto the TE grating coupler 216 at the desired angle with respect to a normal to the plane of the TE grating coupler 216. Moreover, the orientation of the plane of incidence of the light beam is substantially along a longitudinal axis of the TE grating coupler 216. In some implementations, the plane of incidence of the TE polarized light beam can have an angle of about −5° to about +5° or about −10° to about +10° with respect to the longitudinal axis of the TE grating coupler 216. Similarly, the second prism/reflector 206 is positioned in relation to the TM grating coupler 218 such that the second light beam 214 is incident onto the TM grating coupler 218 at the desired angle with respect to a normal to the plane of the TM grating coupler 216. However, the plane of incidence of the TM polarized incident beam is substantially perpendicular to a longitudinal axis of the TM grating coupler 218 unlike the TE light beam (the plane of incidence of which is substantially along the longitudinal axis of the TE grating coupler). In some implementations, the plane of incidence of the TM polarized light beam can have an angle of about 85° to about 95° or about 80° to about 100° with respect to the longitudinal axis of the TM grating coupler 218.

In some implementations, the optical coupler 200 can provide some degree of adjustment (manual or automatic) for the orientations and positions of the PBS 202, the first prism/reflector 204, and the second prism/reflector 206. In some implementations, the first and second prism/reflectors 204 and 206 can include micro-electromechanical systems (MEMS) based reflectors or mirrors, the orientations of which can be adjusted using electrical signals from a controller on the chip. In some implementations, the optical coupler 200 can also include collimating lenses to collimate light in the PBS 202 and/or include focusing lenses to match the light beam width with the scattering modes of the grating couplers 216 and 218.

Figure 4A:
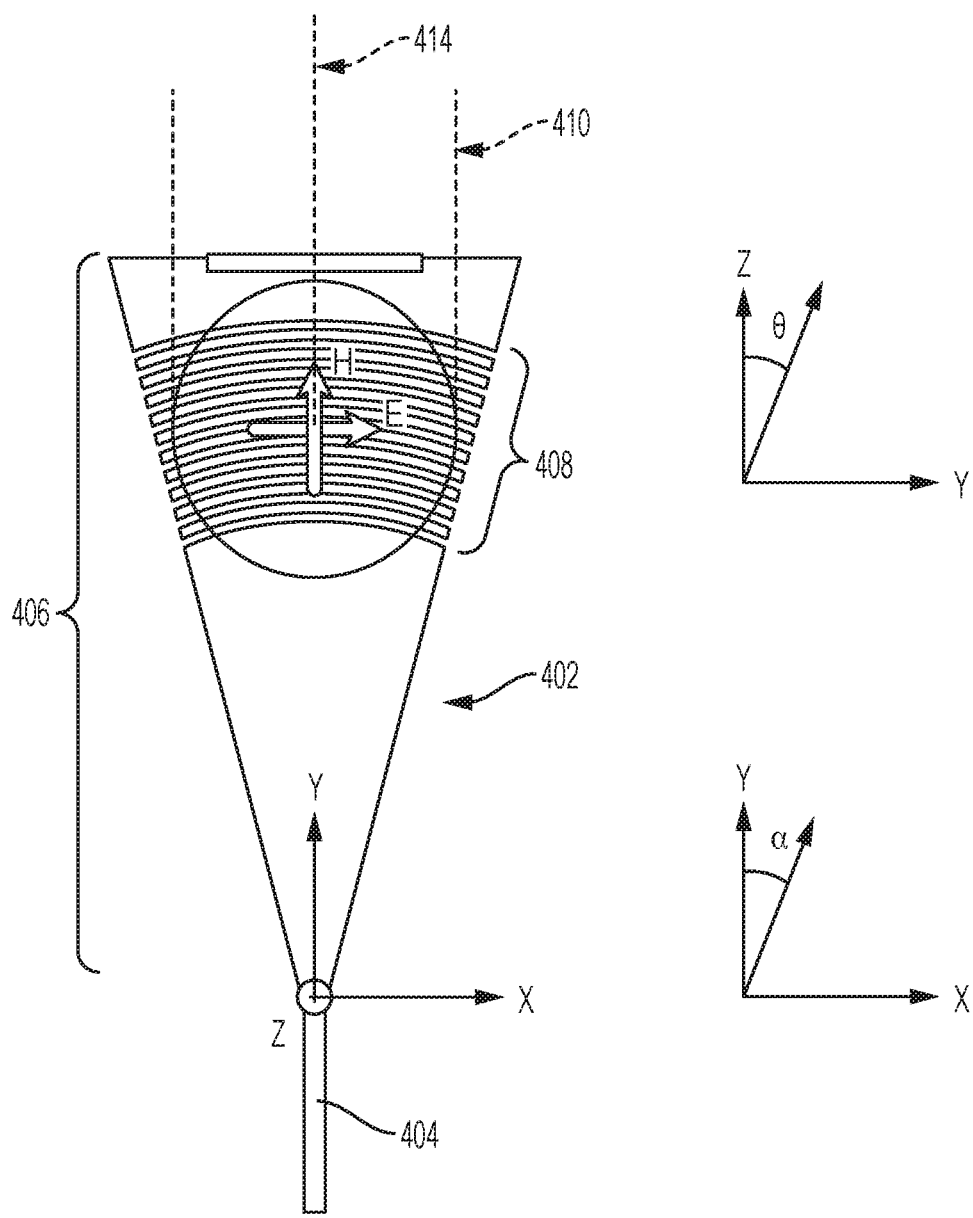
FIGS. 4A-4D show schematics of example grating couplers coupled to waveguides.
Figure 4B:
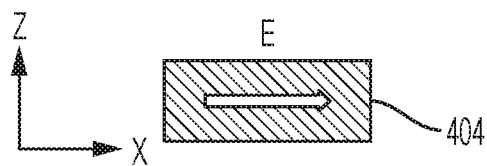
Figure 4C:
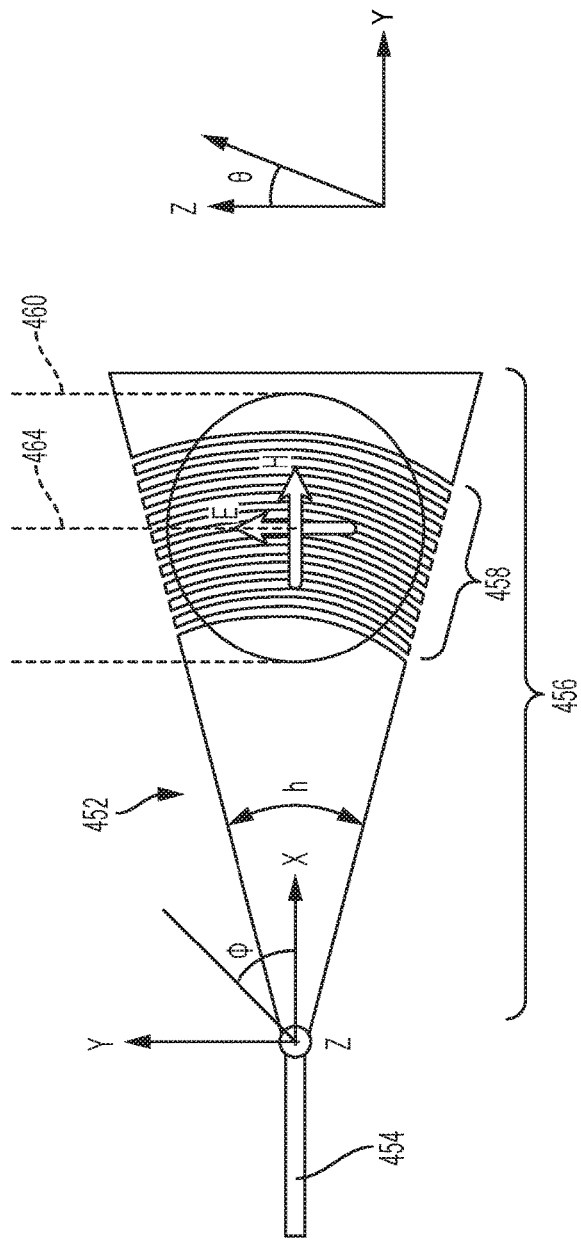
Figure 4D:
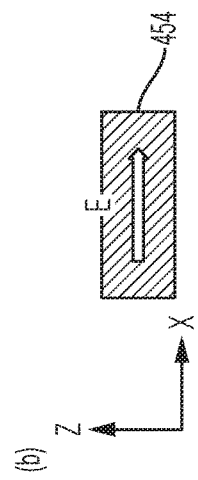

FIGS. 4A-4D show schematics of example grating couplers coupled to waveguides. In particular, FIGS. 4A and 4C show top views of TE and TM grating couplers 402 and 452 coupled to their respective waveguides 404 and 454. FIGS. 4B and 4D show cross-sectional views of the waveguides 404 and 454, respectively. The TE grating coupler 402 shown in FIG. 4A can be utilized for implementing the TE grating coupler discussed above in relation to FIGS. 2 and 3A, while the TM grating coupler 452 shown in FIG. 4C can be utilized for implementing the TM grating coupler discussed above in relation to FIGS. 2 and 3B.

Referring to FIGS. 4A and 4B, the TE grating coupler 402 can include a TE horn section 406, having a narrow end and a broad end. The waveguide 404 can be coupled to the narrow end of the TE horn section 406, while a TE grating 408 can be formed at the broad end of the TE horn section 406. The TE grating 408 can include a plurality of lines or ridges. The horn shape allows coupling of a larger mode incident light with a relatively narrow mode of the waveguide 404. For reference, the plane of the TE grating coupler 402 is shown within the x-y plane of a three-dimensional Cartesian space represented by x, y, and z axes. The horn section 406 can include a longitudinal axis that extends from the narrow end to the broad end of the horn section 406. For ease of reference, FIG. 4A shows the longitudinal axis of the horn section 406 co-incident with the y-axis. In some implementations, the longitudinal axis of the horn section 406 can be an axis of symmetry of the horn section 406. In some implementations, the TE grating 408 can be symmetric along the longitudinal axis, or the axis of symmetry of the horn section 406. The TE grating 408 can include a plurality of grating lines or ridges, for example, shaped or curved as circular, parabolic, or elliptical arcs, separated by trenches formed into the surface of the chip on which the grating coupler 402 is fabricated. In some implementations, the TE grating 408 can include a plurality of periodically spaced regions of like optical index that are separated by spaced regions having a different optical index. The periodically spaced regions are not necessarily separated by trenches. In some implementations, the TE grating 408 can be considered to act as an optical antenna, which directs or guides a light beam incident on the grating towards the narrow end of the horn section 406 and into the waveguide 404.

FIG. 4A also shows a beam of light 410 having TE polarization incident on the TE grating 408. As shown, the electric field (E) is orthogonal or perpendicular to the plane of incidence, which is along the midline 414 of beam 410 and the longitudinal axis of the horn section 406 and parallel to the magnetic field (H). The plane of incidence of the TE polarized beam of light 410 is substantially normal (orthogonal) to the x axis of the first horn section 406. The TE polarized beam of light 410 is incident on the TE grating 408 at an angle θ with respect to a normal (z-axis) to the plane of the grating coupler 402. Having a non-zero angle θ can reduce the risk of light being reflected back to a reflector (such as the prism/reflector 204 shown in FIG. 3A), which reflects the light beam onto the TE grating 408. The TE polarized light beam 410 is oriented with respect to the horn section 406 such that the plane of incidence of the light beam 410 is substantially along the longitudinal axis of the horn section 406. As a result, the direction of electric field (E) of the TE polarization of the TE polarized light beam 410 is substantially perpendicular to the longitudinal axis of the horn section 406 (as shown). Thus, when the TE polarized light beam 410 is incident on the TE grating 408, the incident light 410 is guided by the horn section 406 into the waveguide 404 with a polarization that is substantially parallel to the plane of the x-y plane, as shown in FIG. 4B by the electric field component (E). In some implementations, the plane of incidence of the TE polarized light beam 410 can have an angle α of about 5-10° with respect to the longitudinal axis of the horn section 406.

As mentioned above, FIG. 4C shows a top view of the TM grating coupler 452. The TM grating coupler 452 can include a TM horn section 456 which can be similar in shape to the TE horn section 406 shown in FIG. 4A. The waveguide 454 can be coupled to the narrow end of the TM horn section 456 and a TM grating 458 can be formed at the broad end of the TM horn section 456. The TM grating can include a plurality of lines or ridges. For reference, the plane of the TM grating coupler 452 is shown within the x-y plane. The TM horn section 456 can include a longitudinal axis extending form the narrow end to the broad end of the TM horn section 456. For ease of reference, FIG. 4C shows the longitudinal axis of the TM horn section 456 co-incident with the x-axis.

In some implementations, unlike the TE grating 408 shown in FIG. 4A, which were symmetric along the longitudinal axis of the TE horn section 406, the TM grating 458 can be asymmetric along the longitudinal axis of the TM horn section 456. In some implementations, the asymmetry of TM grating 458 can be represented, in part, by an angle formed between a radius of an elliptical grating arc of the TM grating 458 and the longitudinal axis of the TM horn section 456 within the plane of the TM grating coupler 452. This angle is represented by φ, as shown in FIG. 4C. In some implementations, the elliptical shape of the TM grating lines can be approximated by the following Equations (1)-(3):

$$x = r \cdot \cos(\phi) \tag{1}$$

$$y = -r \cdot \sin(\phi) \tag{2}$$

$$\text{where } r = \frac{1}{1 - e \cdot \cos\left(\phi + \frac{\pi}{2}\right)} \tag{3}$$

FIG. 4C also shows a TM polarized light beam 460 incident on the TM grating 458. As shown, the magnetic field (H) is orthogonal or perpendicular to the plane of incidence, which is along the midline 464 of beam 460 and parallel to the electric field (E). In a manner similar to the TE incident light beam 410 shown in FIG. 4A, the TM polarized light beam 460 also forms an angle of incidence θ with respect to a normal (z-axis) to the plane of the TM grating coupler 452. In some implementations, the angle of incidence formed by the TM polarized light beam 460 with respect to the normal to the plane of the TM grating coupler 452 can be different from the angle formed by the TE incident light beam 410 shown in FIG. 4A. Further, the plane of incidence of the TM light beam 460 is substantially perpendicular to the longitudinal axis of the horn section 456. This is unlike the plane of incidence of the TE light beam 410 shown in FIG. 4A, which was substantially parallel or along the longitudinal axis of the horn section 406. In some implementations, the plane of incidence of the TM polarized light beam 460 can have an angle of about 85-95° or about 80-100° with respect to the longitudinal axis of the horn section 456. The orientation of the incident TM polarized light beam 460 with respect to the TM coupler 452 results in the direction of the electric field (E) of the TM polarized light beam 460 to be perpendicular to the longitudinal axis of the horn section 456. As a result, the TM polarized light 410 is guided into the waveguide 454 with a polarization that is substantially parallel to the x-y plane, as shown in FIG. 4D by the electric field component (E). This is similar to the polarization of the light entering the waveguide 404 coupled to the TE grating coupler 402 shown in FIG. 4B. As the polarization of the light beam in the TM waveguide 454 is the same as the polarization (i.e., the fundamental mode) of the light in the TE waveguide 404 no additional components such as polarization rotators are needed to rotate the polarizations of the light in the TE or TM waveguides. As a result, losses due to components such as polarizer rotators can be avoided, resulting in improved signal quality.

Figure 5:
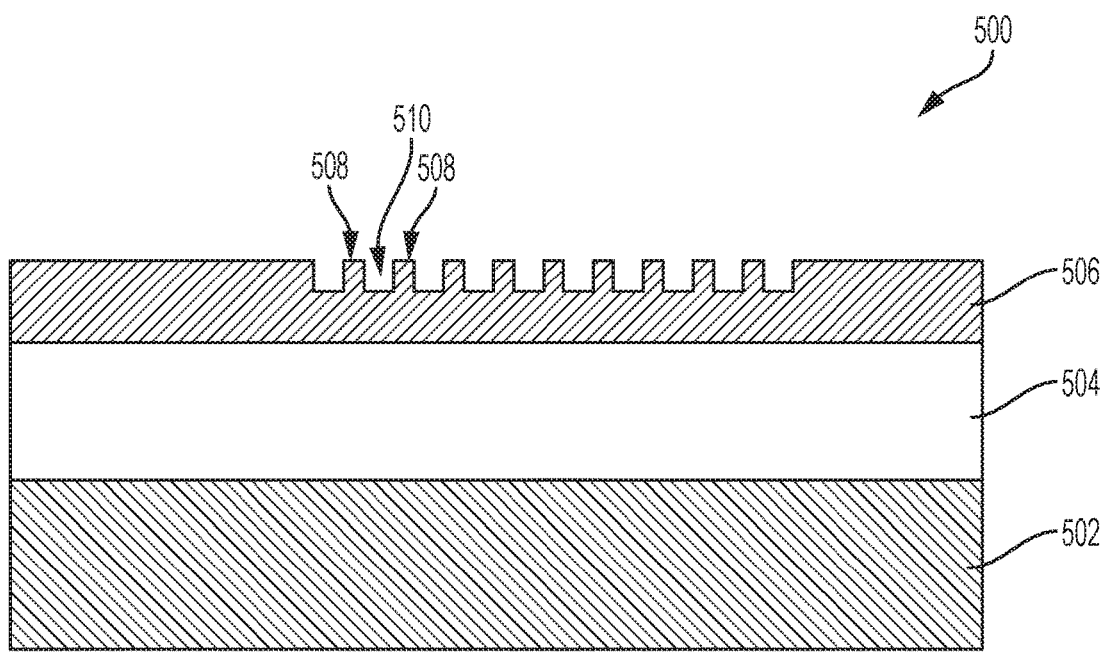
FIG. 5 shows a cross section of an example photonic chip having a grating coupler.

FIG. 5 shows a cross section of an example photonic chip 500 having a grating coupler. In particular, the cross-section of the photonic chip 500 can represent a cross-section along the longitudinal axes of the TE or TM grating couplers 402 and 452 (shown in FIGS. 4A and 4C) along the longitudinal axes of their respective horn sections. FIG. 5 shows silicon-on-insulator (SOI) chip 500 including a silicon handle or substrate 502, a buried oxide layer 504 and a thin silicon layer 506 deposited over the oxide layer 504. The thin silicon layer 506 can be patterned to form a grating having grating lines or ridges 508 separated by trenches 510. In some implementations, these grating features can be patterned using dry or wet etching. In some other implementations, the grating features can be patterned using anisotropic etching techniques. However, other well-known techniques for patterning semiconductors can also be utilized. In some implementations, the thin silicon layer 506 can have a thickness of about hundreds of nanometers.

In some implementations, the width and pitch of the grating lines or ridges 508 and the trenches 510 can be fixed (a uniform grating) or can be varied from trench to trench (apodized grating) to optimize local scattering strength to increase overlap with the incident light beam mode and/or to tune the grating 512 with the wavelength of the incident light beam. In some implementations, the thicknesses of the thin silicon layer 506 or the oxide layer 504 can be selected to optimize the coupling of light from the grating 512 to a fiber and to improve bandwidth. In some implementations, a reflecting layer (dielectric or metal) can be deposited under the grating 512. In some implementations, material such as SiN, SiON can be utilized for forming one or more layers in the photonic chip 500. In some implementations, standard CMOS processes can be used for manufacturing the photonic chip 500.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A coupling apparatus for coupling light from a source to a chip, comprising:
    a beam splitter having an input port, a first output port and a second output port, the beam splitter configured to receive an incident beam of light at the input port and output a first beam of light with substantially transverse-magnetic (TM) polarization from the first output port and output a second beam of light with substantially transverse-electric (TE) polarization from the second output port;
    a first grating coupler formed on the chip, including a first horn section, the first horn section including a first grating with a first plurality of arc-shaped grating lines; and
    a first reflector positioned to reflect the first beam of light onto the first grating coupler such that a first plane of incidence of the first beam of light is substantially normal to the axis of the first horn section, the direction of TM polarization is within the first plane of incidence, and the first beam of light is incident on the first grating at an angle with respect to a normal to the plane of the first grating coupler.

2. The coupling apparatus of claim 1, further comprising:
    a second grating coupler formed on the chip, including a second horn section, the second horn section including a second grating with a second plurality of arc-shaped grating lines; and
    a second reflector positioned to reflect the second beam of light onto the second grating coupler such that a second plane of incidence of the second beam of light is substantially parallel to the axis of the second horn section, the direction of TE polarization is substantially normal to the second plane of incidence, and the second beam of light is incident on the second grating at an angle with respect to a normal to the plane of the second grating coupler.

3. The coupling apparatus of claim 2, wherein the first horn section and the second horn section include silicon.

4. The coupling apparatus of claim 1, wherein the axis of the first horn section is the axis of symmetry of the first horn section within the plane of the first horn section.

5. The coupling apparatus of claim 1, wherein the first plurality of arc shaped grating lines are substantially asymmetric about an axis of the first horn section.

6. The coupling apparatus of claim 2, wherein the second plurality of arc shaped grating lines are shaped substantially as elliptical arcs.

7. The coupling apparatus of claim 1, wherein the first horn section includes a narrow end coupled to a waveguide and the first grating directs incident light toward the narrow end of the horn section and into the waveguide.

8. The coupling apparatus of claim 2, wherein the second horn section includes a narrow end coupled to a waveguide and the second grating directs incident light toward the narrow end of the horn section and into the waveguide.

* * * * *